United States Patent [19]

Holliger et al.

[11] 4,123,428
[45] Oct. 31, 1978

[54] METALLIZED POLYAZO DYES DERIVED FROM A COUPLING COMPONENT OBTAINED BY ACIDIC CONDENSATION OF FORMALDEHYDE WITH AT LEAST ONE PHENOLIC COMPOUND

[75] Inventors: Herbert Holliger, Allschwil; Heinz Wicki, Basel, both of Switzerland

[73] Assignee: Sandoz Ltd., Basel, Switzerland

[21] Appl. No.: 717,523

[22] Filed: Aug. 25, 1976

[30] Foreign Application Priority Data

Sep. 2, 1975 [CH] Switzerland ............... 11404/75

[51] Int. Cl.² .................... C09B 45/24; C09B 45/34
[52] U.S. Cl. ................... 260/145 C; 260/144;
260/145 R; 260/145 A; 260/145 B; 260/146 R;
260/147; 260/148; 260/155; 260/159; 260/160;
260/161; 260/166; 260/167; 260/168; 260/171;
260/172; 260/173; 260/175; 260/177; 260/178;
260/181; 260/184; 260/187; 260/465 D;
562/474; 562/475; 562/476; 562/477
[58] Field of Search ........... 260/145 R, 145 C, 145 A,
260/145 B, 146 R, 147, 148

[56] References Cited

U.S. PATENT DOCUMENTS 3,759,892  9/1973  Wicki ............................. 260/145 C

FOREIGN PATENT DOCUMENTS 1,503,833 10/1967 France ................... 260/145 C

*Primary Examiner*—Charles F. Warren
*Attorney, Agent, or Firm*—Gerald D. Sharkin; Richard E. Vila; Melvyn M. Kassenoff

[57] ABSTRACT

Metal complex polyazo dyes having, as a coupling component radical, the radical of a coupling component K, being the product of the condensation, under acidic conditions, of the formaldehyde with a compound or mixture of compounds of formula (a),

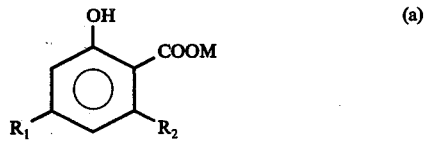

and/or a compound or mixture of compounds of formula (b),

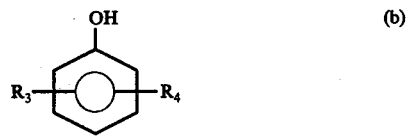

wherein each
$R_1$, $R_2$, $R_3$ and $R_4$ is independently is hydrogen, halogen, hydroxy or optionally substituted alkyl or alkoxy, and
M is hydrogen or a non-chromophoric cation, the mol ratio of formaldehyde to the other compound(s) (a) and/or (b) being at least 0.6:1 and at least 50 mol % of the other compound(s) (a) and/or (b) containing a —COOM group, and, as diazo or bisdiazo component radical, a radical D- or -D- where D contains at least one metallized azo group, their production and their use for the dyeing of anionic dyeable substrates, particularly leather. The dyes have good levelling capacity and the obtained dyeings possess notable fastness to light.

26 Claims, No Drawings

METALLIZED POLYAZO DYES DERIVED FROM A COUPLING COMPONENT OBTAINED BY ACIDIC CONDENSATION OF FORMALDEHYDE WITH AT LEAST ONE PHENOLIC COMPOUND

IMPROVEMENTS IN OR RELATING TO ORGANIC COMPOUNDS

The invention relates to metal complex polyazo compounds.

Thus, the invention provides metal complex polyazo dyes having, as a coupling component radical, the radical of a coupling component K, said K being the product of condensation, under acidic conditions, of formaldehyde with a compound or mixture of compounds of formula (a),

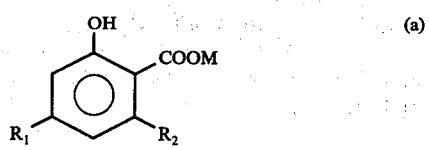

and/or a compound or mixture of compounds of formula (b),

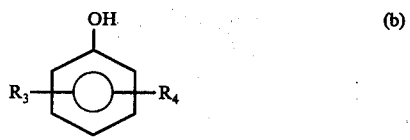

wherein each of
$R_1$, $R_2$, $R_3$ and $R_4$ is independently is hydrogen, halogen, hydroxy or optionally substituted alkyl or alkoxy, and
M is hydrogen or a non-chromophoric cation,
the mol ratio of formaldehyde to the other compound(s) (a) and/or (b) being at least 0.6:1 and at least 50 mol % of the other compound(s) (a) and/or (b) containing a —COOM group, and, as diazo or bisdiazo component radical, a radical D- or -D- where D contains at least one metallised azo group.

The term metallised azo group, as used herein, has the meaning accepted in the art, i.e., an azo grouping having in ortho and ortho' positions (or in equivalent positions, e.g. β and β' positions when non-aromatic carbocycles are bound to the azo group) relative thereto a group selected from —O—*, —CO—O—*, —NH—* and —NR'—*, the metal being bound to the asterisked bond of each group as well as forming a bond with the azo group itself, R' in the above being a phenyl or naphthyl radical, unsubstituted or substituted by one or more substituents selected from $C_{1-4}$alkyl, $C_{1-4}$alkoxy, chlorine, —NO_2, —COOM and —SO_3M, any phenyl radical preferably being unsubstituted or substituted by one or two of said substituents, more preferably not containing more than one group selected from —COOM and —SO_3M, and any naphthyl preferably being unsubstituted or monosubstituted or disubstituted by —SO_3M.

As regards the coupling component K, in the compounds of formulae (a) and (b), any alkyl or alkoxy radical is preferably of 1 to 4 carbon atoms, more preferably of 1 or 2 carbon atoms, except as stated below. As examples of substituents thereon may be given halogen, —COOM, cyano, hydroxy-$C_{2-4}$alkoxy and hydroxy-($C_{2-4}$)-alkoxy. Any alkoxy substituted by one of the last three mentioned substituents is preferably of at least 2 carbon atoms. Any halogen in the compounds of formulae (a) and (b) is preferably chlorine, but may also be fluorine, bromine or iodine.

The preferred significances of $R_1$, $R_2$ and $R_4$ are hydrogen, methyl, methoxy, hydroxy and chlorine, such, together with —O—$CH_2$—COOM, being the preferred significances of $R_3$. At least one of $R_1$ and $R_2$ is preferably hydrogen. Most preferably $R_1$, $R_2$ and $R_4$ are hydrogen. Most preferably $R_3$ is hydrogen, methyl or group hydroxy group.

As examples of compounds of formula (a) may be given salicylic, m-cresotic, 2,4- and 2,6-dihydroxybenzoic and 4-chloro-2-hydroxybenzoic acids and salts thereof, salicylic acid and salts thereof being particularly preferred.

As examples of compounds of formula (b) may be given phenol, resorcinol, o- and p-cresol, o- and p-chlorophenol, 3-methylphenol and 3-hydroxyphenoxyacetic acid, of which resorcinol and the cresols are preferred.

In the production of coupling components K, where mixtures of both compounds of formula (a) and compounds of formula (b) are employed, such mixtures preferably contain at least 50 mol %, more preferably at least 80 mol %, of the compound(s) of formula (a), it being still more preferable to employ solely the compound(s) of formula (a). In the most preferred embodiment, the reaction is carried out solely between salicylic acid and formaldehyde.

The mol ratio of formaldehyde to the compound(s) of formula (a) or (b) is preferably no greater than 0.95:1, the preferred mol ratio being the range of from 0.7 to 0.9:1.

If desired, the formaldehyde may be produced in situ, e.g. using paraformaldehyde, the amount of formaldehyde liberating agent being chosen, however, such that the required amount of formaldehyde is liberated. It is preferred, in fact, to work with paraformaldehyde.

The condensation is conveniently carried out in aqueous medium, in aqueous/inert organic medium or in inert organic medium, suitable organic media being formic and acetic acids. It is preferred, however, to work in aqueous medium. Elevated temperatures are generally employed, preferably from 50° to 130° C., more preferably at temperatures close to the boiling point of the reaction medium, e.g. 90° to 130° C., and optionally under pressure. Mineral acids may be employed, as desired, to create the acidic conditions for the reaction. However, where the compounds of formula (a) or (b) are employed in free acid form, the acidity thereof is generally sufficient. Where mixtures of compounds of formula (a) and/or (b) are employed and one component compound of the mixture is markedly more reactive than the other(s), such compound is preferably added slowly over the course of the condensation reaction, conveniently dissolved in an inert solvent.

The resulting coupling component K may be isolated in conventional manner.

The product of the condensation, i.e., coupling component K, is a mixture of a broad spectrum of oligomerous condensates and is used as such, without separation of the various oligomers.

The preferred coupling components K are those which are soluble to at least 10% in water at neutral pH.

Those products obtained from the reaction of salicylic acid, or its salts, and formaldehyde are preferred which have a Z value, where Z = I(CH$_2$)/I (aromatic), where I(CH$_2$) is the intensity of the signal of methylene protons appearing between 3.0–4.3 ppm, and I(aromatic) is the intensity of the signal of aromatic protons appearing between 6.3 and 8.2 ppm (both measured by means of the NMR spectrum at 60 MHz in dimethyl sulphoxide/D$_2$O) of from 0.43 to 0.85, more preferably from 0.5 to 0.7.

The course of the condensation can be followed chromatographically and the end of reaction ascertained by the loss of odour of the formaldehyde from the reaction mixture when the formaldehyde is not employed in excess.

The preferred coupling component K is K$_1$, i.e., the product of condensation, under acidic conditions, of salicylic acid, or a salt thereof, and, optionally, resorcinol or a cresol, with formaldehyde, the mol ratio of formaldehyde to the other component(s) being from 0.6:1 to 0.95:1, preferably 0.7:1 to 0.9:1, at least 80 mol % of the other components being salicylic acid or a salt thereof.

The most preferred coupling component K is K$_2$, i.e., K$_1$, above, but in which the formaldehyde is condensed with salicylic acid, or a salt thereof, alone.

The exact nature of any non-chromophoric cation as M, used herein, is not critical, any cation conventional in the anionic dye art being suitable. As examples of suitable cations may be given the alkali metal cations, e.g. lithium, sodium and potassium, alkaline earth metal cations, e.g. magnesium, aluminum and unsubstituted or substituted ammonium cations, e.g. of the formula N$^+$(R)$_4$, where each R, independently, is hydrogen, C$_{1-3}$alkyl or C$_{2-3}$hydroxyalkyl, with the proviso that when any R is hydroxyalkyl at least one other R is hydrogen and that the hydroxy group is other than on the α-carbon atom, e.g. triethyl-, triethanol-, triisopropanol-, trimethyl- and tetramethyl-ammonium cations. The sodium cation is generally preferred.

Radical D- or -D- may be the radical of any diazo or bisdiazo component conventional in metal complex polyazo dyestuff chemistry. It preferably contains at least one water solubilising group, such as —COOM or, preferably, —SO$_3$M, more preferably containing at least as many sulpho groups as azo groups, the maximum number of sulpho groups, however, preferably being not more than the number of aromatic carbocyclic rings contained in D- or -D-. The preferred radical is a diazo component radical, i.e. D-.

The preferred radical D- is D'-, i.e. a radical of formula II,

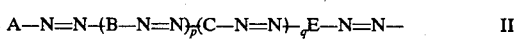

in which
  A is the radical of a diazo or coupling component, preferably the former,
  B and C, independently, are radicals of bisdiazo components or of at least twice coupable coupling components or of couplable/diazo components, preferably the latter, depending on the nature, i.e., coupling or diazo component nature, of A and E,
  E is the radical of a bisdiazo component or of a coupling/diazo component, preferably the latter, the radicals B, C and E, independently, each optionally containing an azo group, and
  p and q, independently, are 0 or 1, with the provisos that i) the radical of formula II contains no more than 5 azo groups and ii) at least one of the azo groups is metallised.

The above radical of formula II may be built up in conventional manner using techniques common in azo chemistry using conventional diazotization and coupling reactions, optionally with the employment of components having protected amino groups or nitro groups reducible to amino groups to avoid undesired or premature diazotisation and coupling.

Preferably, A is the radical of a diazo component and B, C and E are radicals of coupling/diazo components, i.e., of components acting both as coupling and diazo components.

Each of the components in formula II will now be dealt with separately, but for the sake of simplicity will be dealt with in non-metallised form, details of metallisation being dealt with hereinafter.

Where A is the radical of a diazo component, it is conveniently a radical derived from an amine of formula III or IV,

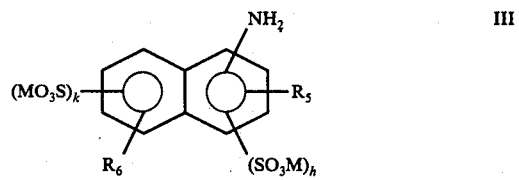

where
  R$_5$ is hydrogen, hydroxy or —SO$_3$M,
  R$_6$ is hydrogen or —NO$_2$,
  h is 0 or 1, and
  k is 0 or 1,
there preferably being no more than two sulpho groups in the compound III, more preferably there being 1 or 2,

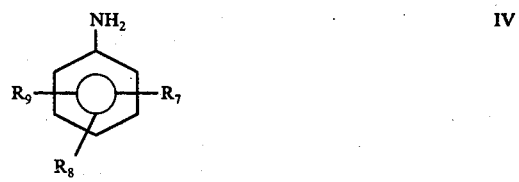

where
  R$_7$ is hydrogen, hydroxy, C$_{1-4}$alkyl, C$_{1-4}$alkoxy, —COOM or chlorine,
  R$_9$ is hydrogen, C$_{1-4}$alkyl, chlorine, —SO$_3$M, —SO$_2$NH$_2$ or —NO$_2$, and
  R$_8$ is hydrogen, C$_{1-4}$alkyl, C$_{1-4}$alkoxy, —COOM, chlorine, —SO$_3$M, —NO$_2$, acylamino or a radical (c),

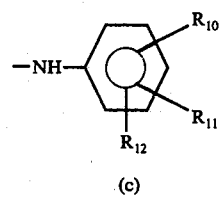

(c)

wherein
  R$_{10}$ and R$_{11}$, independently, are hydrogen, —NO$_2$ or —SO$_3$M, and $R_{12}$ is hydrogen, $C_{1-4}$alkyl, $C_{1-4}$alkoxy, chlorine or —COOM, any acyl in any acylamino as $R_8$ being formyl, $C_{1-4}$alkylcarbonyl, phenylcarbonyl, phenylsulphonyl or tolylsulphonyl, preferably acetyl, formyl, phenylsulphonyl or tolylsulphonyl, more preferably formyl or acetyl.

In the amine of formula IV, $R_7$ is preferably ortho to the —NH$_2$ group and is preferably hydroxy (for metallisation). $R_8$ and $R_9$ are preferably located meta to the —NH$_2$ group and, independently, are preferably hydrogen, chlorine, —NO$_2$ or —SO$_3$M, especially the latter two. When $R_8$ is hydrogen, another preferred significance of $R_9$ is —SO$_2$NH$_2$.

In any radical (c) in formula IV, it is preferred that either $R_{10}$ and $R_{11}$ are hydrogen and $R_{12}$ is hydrogen, methyl or methoxy or $R_{12}$ is hydrogen, $R_{10}$ is hydrogen or —NO$_2$ and $R_{11}$ is —SO$_3$M. Any substituent as $R_{10}$, $R_{11}$ or $R_{12}$ is preferably in ortho position relative to the —NH— group.

Where B, C and/or E are radicals of coupling/diazo components they are, independently, conveniently radicals derived from compounds of formula VI, VIII or IX,

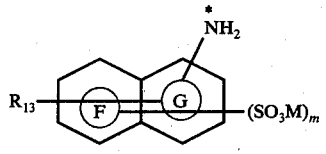

VI where $m$ is 1 or 2, $R_{13}$ is hydrogen, hydroxy, —NH$_2$ or a radical (e),

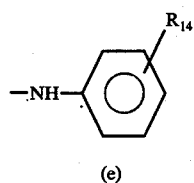

(e)

wherein $R_{14}$ is hydrogen, $C_{1-4}$alkyl, $C_{1-4}$alkoxy or chlorine, preferably hydrogen, methyl or methoxy, where $R_{13}$ is —NH$_2$, such being in the F ring, and coupling taking place ortho thereto, the —NH$_2$ group optionally being in protected form or present as —NO$_2$ (reducible to —NH$_2$) prior to diazotisation thereof and coupling therewith,

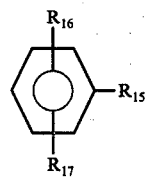

VIII where $R_{15}$ is —NH$_2$, —NH—Acyl, —NH—CH$_2$—SO$_3$M or a radical (c), above, $R_{16}$ is hydrogen, $C_{1-4}$alkyl, $C_{1-4}$alkoxy, hydroxy, chlorine, —NH$_2$ or —COOM, and $R_{17}$ is hydrogen, $C_{1-4}$alkyl, $C_{1-4}$alkoxy or —SO$_3$M, with the proviso that the compound contains at least one diazotisable amino group or a nitro, acylamino (preferably acetylamino) or amino-ω-methanesulphonyl group convertable to a diazotisable amino group,

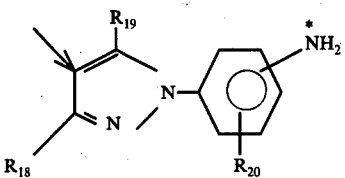

IX where $R_{18}$ is $C_{1-4}$alkyl, —COOM, —COOR$_{21}$ or —COR$_{21}$, $R_{19}$ is —OH or —NH$_2$, $R_{20}$ is hydrogen, $C_{1-4}$alkyl, $C_{1-4}$alkoxy, chlorine or —SO$_3$M, and $R_{21}$ is $C_{1-4}$alkyl or phenyl, the —NH$_2$ group optionally being in protected form or present as —NO$_2$ (reducible to —NH$_2$) prior to diazotisation thereof and coupling therewith.

The preferred protected forms of the —NH$_2$ groups present in the compounds of formulae VI and IX are the —NH—Acyl, particularly acetylamino, group and the —NHCH$_2$SO$_3$M group, both of which, like any such group in compounds of VIII and like —NO$_2$ groups are readily convertible into —NH$_2$ groups in conventional manner prior to diazotisation and coupling.

The preferred compounds of formula VI are the compounds of formula VI',

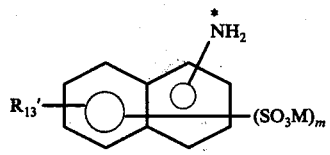

VI' where $R_{13}'$ is hydrogen, hydroxy, phenylamino or tolylamino, preferably hydroxy.

In the compounds of formula IX, $R_{20}$ is preferably —SO$_3$M or hydrogen, more preferably the latter. $R_{19}$ is preferably hydroxy. $R_{18}$ is preferably methyl.

Where B, C and/or E are radicals of bisdiazo components, they are, conveniently, independently, radicals derived from compounds of formula X, XI or XII,

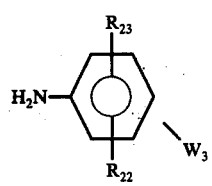

X where $W_3$ is —NO$_2$ or acylamino (convertible to —NH$_2$), preferably —NO$_2$, $R_{22}$ is hydrogen, hydroxy, chlorine, $C_{1-4}$alkyl or $C_{1-4}$alkoxy, preferably methyl, hydrogen or hydroxy, more preferably hydrogen or hydroxy, and $R_{23}$ is hydrogen, chlorine, $C_{1-4}$alkyl, $C_{1-4}$alkoxy, —COOM or —SO$_3$M, preferably hydrogen or —SO$_3$M,

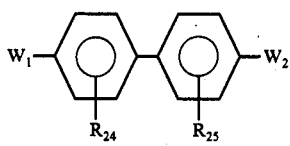

XI in which
one of $W_1$ and $W_2$ is —$NH_2$ and other of $W_1$ and $W_2$ is —$NH_2$, acylamino or nitro (convertible to —$NH_2$), and $R_{24}$ and $R_{25}$, independently, are $C_{1-4}$alkyl, $C_{1-4}$alkoxy, chlorine or —$SO_3M$,

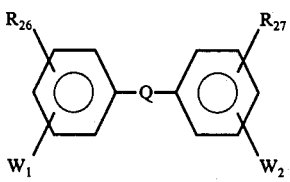

XII where
Q is —O—, —S—, —NH—, —$SO_2$—, —$SO_2NH$—, —CONH—, —NH—CO—NH— or —CH=CH—,
and
$R_{26}$ and $R_{27}$, independently, are hydrogen, $C_{1-4}$alkyl, $C_{1-4}$alkoxy, chlorine, or —$SO_3M$.

In the compounds of formula X, where $W_3$ is nitro, as is preferred, and $R_{22}$ is alkoxy (preferably methoxy) or hydroxy, $R_{22}$ is preferably para to the nitro group, the nitro group being meta to the —$NH_2$ group, and where $R_{23}$ is —$SO_3M$, such —$SO_3M$ group is preferably meta to the nitro group. Where $R_{22}$ and $R_{23}$ are both selected from alkyl and alkoxy they are preferably para relative to one another.

In the compounds of formulae X, XI and XII, the preferred alkyl and alkoxy radicals are, respectively, the methyl and methoxy radicals.

In the compounds of formula XII, Q is preferably —NH—, —CONH— or —CH=CH— and $R_{26}$ and $R_{27}$ are preferably, independently, hydrogen or —$SO_3M$. When Q is —NH—, preferably $R_{26}$ is hydrogen and $R_{27}$ is —$SO_3M$. When Q is —CONH—, preferably both $R_{26}$ and $R_{27}$ are hydrogen. When Q is —CH=CH—, preferably $R_{26}$ and $R_{27}$ are both —$SO_3M$. Preferably, either both $W_1$ and $W_2$ are —$NH_2$ or one is —$NH_2$ and the other is —$NO_2$.

Where B and/or C are radicals of a twice couplable coupling component, they are preferably derived from resorcinol, m-aminophenol, m-phenylenediamine or a naphthalene monosulfonated or disulphonated in any of positions 3 to 6 and, in positions 1 and 8, being substituted by a substituent selected from —OH and —$NH_2$, e.g. 1,8-dihydroxynaphthalene-3,6-disulfonic acid and 1-amino-8-hydroxynaphthalene-3,6- or -4,6-disulphonic acid.

Where A is the radical of a coupling component, such coupling component may be any conventional in the azo dyestuff art such as hydroxy or amino group bearing benzenes or naphthalenes, optionally further substituted, for example by $C_{1-4}$alkyl, $C_{1-4}$alkoxy, —$SO_3M$ and —COOM groups, pyrazolones, 5-aminopyrazoles, acetoacetanilide and acetoacettoluidide and 8-hydroxyquinoline.

Particularly preferred compounds of the invention are the compounds wherein D— is D"—, i.e., of formula II',

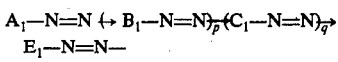

II' where
$A_1$ is the radical of diazo component derived from a compound of formula III or IV, above,
$B_1$, $C_1$ and $E_1$, independently, are radicals of diazo/coupling components derived from compounds of formulae VI, VIII and IX, above, and
p and q are as defined above, with the proviso that at least one of the azo groups in formula II' is metallised.

In the radical of formula II' at least one of p and q is preferably O. More preferably both are O.

Where D— is a radical D'— or D"—, the radical of the coupling component is preferably of the coupling component $K_1$, more preferably of the coupling component $K_2$.

Among the preferred compounds of this application are those wherein (a) D— is a radical of formula II' wherein none of B, C and E is derived from a compound of formula IX, and K is $K_1$ and (b) D— is a radical of formula II wherein A is a diazo component radical derived from an amine of formula III or IV and (i) B, C and E are radicals of coupling/diazo components of formula VI or VIII or (ii) only one of B, C and E is the radical of a coupling/diazo component of formula IX.

As representative of compounds of formulae III and IV may be given 2-amino-1-hydroxy-4-nitrobenzene, 2-amino-1-hydroxy-4-nitrobenzene-6-sulphonic acid, 2-amino-1-hydroxy-6-nitrobenzene-4-sulphonic acid, 2-amino-4,6-dinitro-1-hydroxybenzene, 2-amino-1-hydroxybenzene-4-sulphonic acid, 2-amino-1-hydroxybenzene-4-sulphonic acid amide, 2-amino-6-carboxy-1-hydroxybenzene-4-sulphonic acid, 1-aminobenzene-2-carboxylic acid, 3-amino-4-methyl-2'-nitrodiphenylamine-4'-sulphonic acid, 4-amino-4'-nitrodiphenylamine-2'-sulphonic acid, 2-amino-1-methoxybenzene-4-sulphonic acid, 1-aminobenzene-3-sulphonic acid, 1-aminobenzene-4-sulphonic acid, 1-aminonaphthalene-6- or -7-sulphonic acid, 1-amino-2-hydroxynaphthalene-4-sulphonic acid and 1-amino-2-hydroxy-6-nitronaphthalene-4-sulphonic acid.

As representative of compounds of formulae VI, VIII and IX may be given 2-amino-8-hydroxynaphthalene-6-sulphonic acid, 2-amino-8-hydroxynaphthalene-7-sulphonic acid, 1-amino-8-hydroxynaphthalene-3,6-disulphonic acid, 2-amino-8-hydroxynaphthalene-3,6-disulphonic acid, 1-amino-8-hydroxynaphthalene-4,6-disulphonic acid, 1-(4'-aminophenyl)-3-methyl-5-pyrazolone, 1-(3'-aminophenyl)-3-methyl-5-pyrazolone, 3-amino-4-methyl-2'-nitrodiphenylamine-4'-sulphonic acid, 1-aminonaphthalene-6-sulphonic acid, 1-amino-3-methylbenzene, 1-amino-2-methoxybenzene-ω-methanesulphonic acid, 2-acetylamino-8-hydroxynaphthalene-6-sulphonic acid, 2-amino-1-methoxy-4-methylbenzene and 2-amino-1,4-dimethoxybenzene.

As will be appreciated, for metallisation to take place prior to metallisation there must be at least one metallisable azo group present in the unmetallised precursors to the compounds of the present invention.

The directly metallisable groups attached in ortho and ortho' positions (or equivalent positions) to the azo groups are the groups —OH, —COOH, —NH$_2$ and —NHR' where R' is as defined above. Whilst these groups are preferred, particularly the —OH groups, other groups, similarly attached, are indirectly metallisable and these include alkoxy, e.g. methoxy groups, which in known manner can be converted to —OH groups before or during metallisation, chlorine atoms which likewise can be replaced, before or during metallisation by a hydroxy group and, in the case where a hydroxy group is in ortho position, a hydrogen atom in the ortho' position can be converted into a hydroxy group during oxidative copperisation. Such conversions are known in the art of metallised azo dyestuff chemistry. Naturally, the compounds from which radicals A, B, C and E or A', B', C' and E' are chosen will be selected to ensure the presence of such metallisable azo groups.

As regards the metals contained in the complexes of the invention, these are, for example, copper, nickel, iron, chromium and cobalt, copper, chromium and cobalt being preferred. Copper and nickel form 1:1 metal complexes, iron forms 1:2 metal complexes and chromium and cobalt form both 1:1 and 1:2 metal complexes. Metal metal complexes, i.e., involving at least two different metals, are also possible.

Whilst, in the compounds of the invention, it is essential for at least one of the azo groups in D— or —D— to be metallised, further metallisation, e.g. of further azo groups and metallisation arising from the presence of other metallised groups in the compounds, e.g. hydroxy and carboxylic acid groups in ortho or equivalent relative positions, is possible both in radical D— or —D— and in the radical of the coupling component K. In the preferred compounds of the invention, however, metallisation is solely in radical D— or —D—.

Also provided by the invention is a process for the production of the metal complex polyazo dyes of the invention, which process comprises either a). coupling the monodiazo or bisdiazo derivative of an amine or diamine D—NH$_2$ or H$_2$N—D—NH$_2$, where D is as defined above, with a coupling component K, defined above, or b). metallising a polyazo dye having, as coupling component radical, a radical of a coupling component K, defined above, and as diazo or bisdiazo component radical a radical Dx— or —Dx— where Dx contains at least one metallisable azo group.

The above processes may be carried out in conventional manner, the former involving diazotisation and coupling of an already metallised diazo component, the latter involving metallisation as a final step after diazotisation and coupling has been carried out. As will be appreciated, a combination of both processes may be carried out, e.g. by coupling an already metallised diazo component with a coupling component K, followed by further metallisation with the same or a different metal.

Diazotisation and coupling take place in conventional manner, as does metallisation, using the necessary amount of metal compounds for the production of the metal complex compounds. Suitable copper compounds are e.g. copper-II-chloride, -acetate, -formate and, preferably, -sulphate. Suitable nickel compounds are e.g. nickel formate, nickel acetate and nickel sulphate. Suitable chromium compounds are e.g. chromium trioxide, chromium-III-chloride, chromium-III-sulphate, chromium-III-formate, chromium-III-acetate, potassium chromium-III-sulphate and ammonium chromium-III-sulphate; the chromates, e.g. sodium and potassium chromate and bichromate, are also suitable for metallisation in the presence of a mild reducing agent such as glucose. The cobalt compounds used are, e.g. cobalt-II-formate, -acetate, -sulphate and -chloride, preferably in the presence of an oxidation agent such as nitrobenzenesulphonic acid, hydrogen peroxide or oxygen (air) to oxidise the Co$^{+2}$ to Co$^{+3}$. The iron compounds used are e.g. iron-II- and -III-sulphate and -nitrate and iron trichloride.

The compounds produced according to the invention may be separated in known manner from the reaction mixture and purified if necessary. They may be used in diluted form, optionally with usual diluting agents, and are advantageously used in the form of salts.

The metal complex compounds according to the invention, particularly those containing sulpho groups in D— are or —D—, useful as anionic dyes, and they may be used in general for dyeing textile or non-textile substrates which may be dyed with anionic dyestuffs. These are e.g. substrates of natural or regenerated cellulose, natural or synthetic polyamide, polyurethane or basic modified polyolefins, which may be present in any form, e.g. as loose fibres, filaments, threads, felts, non-woven fabrics, woven fabrics, knit fabrics, semi-finished or ready-made goods, or even in the form of shaped articles which do not contain fibres; paper is advantageously dyed in the stock or after sheet formation. Anodised aluminum or especially leather may also be dyed. The aluminum may be anodised by any usual process, and the leather may be tanned by any usual tanning method, e.g. using vegetable or synthetic tanning agents, be chromium-tanned or semi-chromium tanned.

Dyeing may take place by any usual method which is suitable for the substrate to be dyed, e.g. especially with woven fabrics by the exhaustion, pad-dyeing or printing methods, whereby the dyestuffs may be used in amounts up to the saturation limit of the substrate.

The dyestuffs according to the invention have good levelling capacity when dyed on leather of differing tannings, as well as good, even colouring capacity on the grain side and the flesh side, and the dyestuffs which contain in D— or —D— at least as many sulpho groups as azo groups possess good migration fastness. Also, light fastness on leather is in general, and particularly when D— or —D— contains a single azo group, notable.

A wide variety of dyeing colours, from yellow to dark red and violet, as well as brown and grey tones can be obtained using different compounds of the invention.

The dyestuffs according to the invention may be used both alone and in combination with other comparable dyestuffs.

In the following examples, if not otherwise stated, the parts and percentages are by weight, and the temperatures are in degrees centigrade.

EXAMPLE 1

276 Parts of salicylic acid, 100 parts of 20% sodium hydroxide solution and 42 parts of paraformaldehyde are stirred for 10 hours at 98°. The resultant viscous melt which no longer shows any trace of formaldehyde, is made neutral with 155 parts of 30% sodium hydroxide solution and is vacuum dried at 100° and then ground. 320 Parts of slightly brownish powder are obtained.

EXAMPLE 2

276 Parts of salicylic acid, 130 parts of 30% sodium hydroxide solution and 51 parts of paraformaldehyde were stirred for 10 hours at 98°. The resulting viscous melt, which no longer shows any trace of formaldehyde, is made neutral with 130 parts of 30% sodium hydroxide solution and made up to 600 parts with water.

EXAMPLE 3

138 Parts of salicylic acid, 75 parts of 10% sodium hydroxide solution and 24 parts paraformaldehyde were refluxed for 2 hours. Then, over 1 hour, 22 parts of resorcinol, dissolved in 20 parts water, were added dropwise to the solution held at the boil. Finally, a further 4 parts of paraformaldehyde were added and the whole was refluxed for 7 hours. The condensation product was neutralised by addition of 80 parts of 30% sodium hydroxide and water was added to make up 400 parts.

EXAMPLE 4

48.4 Parts of a compound which in free acid form is of formula XIV,

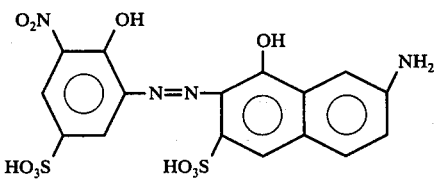

obtained by diazotisation of 2-amino-1-hydroxy-6-nitrobenzene-4-sulphonic acid and alkaline coupling with 2-amino-8-hydroxynaphthalene-6-sulphonic acid, is stirred with 400 parts of water and 12 parts chromium III acetate for 5 hours at 98° at a pH of from 4 to 5. Following this chromisation the reaction mixture is set with sodium hydroxide to a pH of 11, cooled to 10°, then set with hydrochloric acid to a pH of 1 and finally diazotised by dropwise addition of 25 parts by volume of 4N sodium nitrite solution, the pH being maintained between 1 and 1.5 by addition of concentrated hydrochloric acid. At the end of diazotisation, the resulting suspension is dropwise added to 32 parts of the product of Example 1, dissolved in 80 parts of water, at 10° and at a pH of 13, the pH being maintained at 13 by addition of concentrated sodium hydroxide.

The resulting dyestuff was isolated by addition of sodium chloride and hydrochloric acid. The product, dried under vacuum at 100°, is a black powder which dyes leather in grey tones with notable light and wet fastness.

EXAMPLE 5

By repeating Example 4 but reaplacing therein the product of Example 1 with 60 parts of the solution obtained in Example 2, a dyestuff is obtained, similar in properties to that produced in Example 4.

EXAMPLE 6

By repeating Example 4 but replacing therein the product of Example 1 with 80 parts of the solution obtained in Example 3, a dyestuff is obtained, similar in properties to that produced in Example 4.

EXAMPLE 7

48.4 Parts of the compound of formula XIV, employed in Example 4, were stirred with 400 parts water at 70°. To this suspension at 70° and at a pH of 9 were added, dropwise, 14.5 parts $CoSO_4.7H_2O$ dissolved in 50 parts water, the pH being maintained at 9 by addition of sodium hydroxide solution. After this cobaltisation, the reaction mixture was cooled to 10°, set to a pH of 1 by addition of concentrated hydrochloric acid and finally diazotised by dropwise addition of 25 parts by volume of sodium nitrite solution, the pH being maintained at 1 to 1.5 by addition of hydrochloric acid. After diazotisation, the resulting suspension is added dropwise to 32 parts of the product of Example 1, dissolved in 80 parts at 19° C. and at a pH of 13, the pH being maintained at 13 by addition of concentrated sodium hydroxide.

The resulting dyestuff was isolated by addition of sodium chloride and hydrochloric acid. Dried under vacuum at 100° the dry dyestuff is a dark violet powder which dyes leather in reddish grey tones of notable light and wet fastness.

EXAMPLE 8

48.4 Parts of the compound of formula XIV, employed in Example 4, were stirred with 400 parts water and 20 parts of a 25% ammonium solution at 50° C. To the resulting suspension were added, dropwise at 50° C., 25 parts of copper II sulphate (5 mols water of crystallisation) dissolved in 150 parts of water. After this copperisation, the reaction mixture was cooled to 10° and diazotised by addition of 25 parts by volume of 4N sodium nitrite solution, the pH being maintained at between 1 and 1.5 by addition of concentrated hydrochloric acid. After diazotisation, the suspension was added dropwise to 32 parts of the product of Example 1 dissolved in 80 parts of water at 10° and at a pH of 13, the pH being maintained at 13 by addition of concentrated sodium hydroxide solution.

The resulting dyestuff is isolated by addition of sodium chloride and hydrochloric acid. Drying under vacuum at 100° gives a dark red powder which dyes leather in bordeaux tones with notable wet and light fastness properties.

The following table contains further dyestuffs according to the invention, wherein the radical D— in the form of the free acid corresponds to the formula $$A_2-N=N-E_2- \qquad \text{VII}$$

the dyestuffs being produced similarly to the process given in Examples 4–8 and being characterised by the amines $A_2$—$NH_2$ and $E_2$—$NH_2$, the complex-bound metal Me and the number, n, of the mols of salicylic acid used for the production of the condensation product of Example 1 per mol of diazo component and by the shade of the leather dyeings obtained.

| Ex. No. | $A_2$-$NH_2$ | $E_2$-$NH_2$ | Me | n | Coupling component K produced as in Example | Shade |
|---|---|---|---|---|---|---|
| 9 | 2-amino-1-hydroxy-4-nitrobenzene-6-sulphonic | hydroxynaphthalene-sulphonic acid | Cr 1:2 | 2 | 1 | grey |

-continued

| Ex. No. | A$_2$-NH$_2$ | E$_2$-NH$_2$ | Me | n | Coupling component K produced as in Example | Shade |
|---|---|---|---|---|---|---|
| | acid | | | | | |
| 10 | " | " | Co 1:2 | 2 | 1 | grey |
| 11 | " | " | Cu 1:2 | 2 | 1 | bordeaux |
| 12 | " | 2-amino-5-hydroxynaphthalene-7-sulphonic acid | Cr 1:2 | 2 | 1 | grey-black |
| 13 | " | " | Co 1:2 | 2 | 1 | grey-blue |
| 14 | " | " | Cu 1:1 | 2 | 1 | bordeaux |
| 15 | " | 1-(4'-aminophenyl)-3-methyl-5-pyrazolone | Cr 1:2 | 2 | 1 | orange |
| 16 | " | " | Co 1:2 | 2 | 1 | yellowish brown |
| 17 | " | 1-(3'-aminophenyl)-3-methyl-5-pyrazolone | Cr 1:2 | 2 | 1 | orange |
| 18 | " | " | Co 1:2 | 2 | 1 | yellowish brown |
| 19 | " | 3-amino-4-methyl-2'-nitrodiphenyl-amine-4'-sulfonic acid | Co 1:2 | 2 | 1 | brown |
| 20 | 2-amino-1-hydroxy-6-nitrobenzene-4-sulphonic acid | 1-(3-aminophenyl)-3-methyl-5-pyrazolone | Cr 1:2 | 2 | 1 | orange |
| 21 | " | " | Co 1:2 | 2 | 1 | yellowish brown |
| 22 | " | 1-(4'-aminophenyl)-3-methyl-5-pyrazolone | Cr 1:2 | 2 | 1 | orange |
| 23 | " | " | Co 1:2 | 2 | 1 | yellowish brown |
| 24 | " | 2-amino-5-hydroxynaphthalene-7-sulfonic acid | Cr 1:2 | 2 | 1 | blue grey |
| 25 | " | " | Co 1:2 | 2 | 1 | grey |
| 26 | " | 3-amino-4-methyl-2'-nitro-diphenylamine-4'-sulphonic acid | Co 1:2 | 2 | 1 | brown |
| 27 | 2-amino-1-hydroxy-4-nitrobenzene | 2-amino-8-hydroxynaphthalene-6-sulphonic acid | Cr 1:2 | 2 | 1 | grey |
| 28 | " | " | Co 1:2 | 2 | 1 | dark brown |
| 29 | " | 2-amino-5-hydroxynaphthalene-7-sulphonic acid | Cr 1:2 | 2 | 1 | grey-black |
| 30 | " | " | Co 1:2 | 2 | 1 | dark brown |
| 31 | " | 1-amino-8-hydroxynaphthalene-3,6-disulphonic acid | Cr 1:2 | 2 | 1 | grey |
| 32 | " | " | Cr 1:2 | 4 | 1 | grey |
| 33 | " | " | Co 1:2 | 2 | 1 | grey |
| 34 | " | " | Cu 1:1 | 2 | 1 | bordeaux |
| 35 | " | 2-amino-8-hydroxynaphthalene-3,6-disulphonic acid | Cr 1:2 | 2 | 1 | grey |
| 36 | 1-aminobenzene-2-carboxylic acid | 2-amino-8-hydroxynaphthalene-6-sulphonic acid | Cr 1:2 | 2 | 1 | brown |
| 37 | 2-amino-1-hydroxy-benzene-4-sulphonic acid | " | Cr 1:2 | 2 | 1 | dark blue |
| 38 | 2-amino-1-hydroxy-benzene-4-sulphonic acid amide | " | Cr 1:2 | 2 | 1 | grey |
| 39 | 2-amino-4,6-dinitro-1-hydroxybenzene | " | Cr 1:2 | 2 | 1 | grey |
| 40 | " | " | Co 1:2 | 2 | 1 | grey |
| 41 | " | 1-amino-8-hydroxynaphthalene-3,6-disulphonic acid | Cr 1:2 | 2 | 1 | blue-grey |
| 42 | " | " | Co 1:2 | 2 | 1 | grey |
| 43 | " | 2-amino-8-hydroxynaphthalene-3,6-disulphonic acid | Cr 1:2 | 2 | 1 | grey |
| 44 | " | " | Co 1:2 | 2 | 1 | dark brown |
| 45 | " | 3-amino-4-methyl-2'-nitro-diphenylamine-4'-sulphonic acid | Co 1:2 | 2 | 1 | dark brown |

By repeating Examples 9-45 but replacing the condensation product of Example 1 with a corresponding amount of condensation product of Example 2 so that the value of n remains the same, similar dyestuff shades are obtained. By replacing in the above Examples 9-45 the condensation product of Example 1 with a corresponding amount of the condensation product of Example 3, similar dyestuffs with a light reddish shade are obtained.

DYEING EXAMPLE A

100 Parts of newly tanned and neutralised chromium grain leather are milled for 30 minutes in the dye tub in a liquor consisting of 250 parts of water at 55° and 0.5 parts of the dyestuff of Example 4, they are then treated in the same bath for a further 30 minutes with 2 parts of an anionic fat liquor based on sulphonated train oil, and the leathers are dried and cured in the usual manner. An evenly dyed leather in a grey shade is obtained.

DYEING EXAMPLE B

100 Parts of calf suede are milled in the dye tub for 4 hours with 1000 parts of water and 2 parts of ammonia and are subsequently dyed in a new bath. 500 parts of water at 55°, 2 parts of ammonia, 5 parts of the dissolved dyestuff described in Example 4 are dyed for 1½ hours in the dye tub together with the previously milled calf leather. In order to exhaust the dyebath, 4 parts of formic acid (85%) are slowly added and dyeing continues until the dyestuff has been completely fixed. The suede leathers which are rinsed, dried and cured in the normal manner result in a very evenly dyed grey suede, after buffing the suede side.

DYEING EXAMPLE C

100 Parts of lamb's leather, chromium vegetable tanned, and 5 parts of the dyestuff obtained in Example 4 are milled for 45 minutes in the dye tub in a liquor consisting of 1000 parts of water at 55° and 1.5 parts of an anionic emulsion of spermaceti oil, and the dyestuff is fixed on the leather by slowly adding 5 parts of formic acid (85%) over 30 minutes. After the usual drying and curing processes, a leather in a grey shade which is very even is obtained.

DYEING EXAMPLE D

A solution of 20 parts of the dyestuff produced in Example 4 in 847 parts of water, 150 parts of ethyl glycol and 3 parts of formic acid (85%) is applied by spraying, plushing and coating to the grain side of a buffed, combed tanned cowhide.

The leather is dried and cured under mild conditions. A leather is obtained in a grey shade, with good fastness properties.

The dyestuffs of Examples 5 to 45 may be used in a similar manner, with even leather dyeings of the individual shades being obtained.

In the above examples the dyes are employed in combination with sodium carbonate.

What is claimed is:

1. A metal complex polyazo dye having a diazo component radical D— or a bisdiazo component radical —D— and, as a coupling component radical, the radical of a coupling component K,
wherein
D— is a diazo component radical having at least one metallized azo group,
—D— is a bisdiazo component radical having at least one metallized azo group, and
K is the product of the condensation, under acidic conditions, of formaldehyde with
(i) a compound of the formula

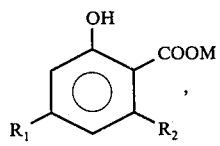

or a mixture of such compounds,
(ii) a compound of the formula

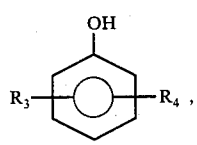

or a mixture of such compounds, or
(iii) a compound of the formula

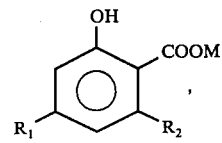

or a mixture of such compounds, and a compound of the formula

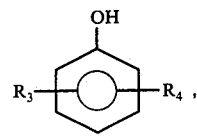

or a mixture of such compounds,
wherein each of
$R_1$, $R_2$, $R_3$ and $R_4$ is independently hydrogen, halo, hydroxy, alkyl, substituted alkyl, alkoxy or substituted alkoxy, and
M is hydrogen or a non-chromophoric cation,
with the provisos that the mol ratio of formaldehyde to the compound or mixture of compounds of (i), (ii) or (iii) is at least 0.6:1 and that at least 50 mol % of the compounds or mixture of compounds of (i), (ii) or (iii) contains a —COOM group,
wherein
M is hydrogen or a non-chromophoric cation.

2. A dye according to claim 1
wherein each of
$R_1$, $R_2$, $R_3$ and $R_4$ is independently hydrogen; fluoro; chloro; bromo; iodo; hydroxy; $C_{1-4}$alkyl; $C_{1-4}$alkyl substituted by fluoro, chloro, bromo, iodo, —COOM, cyano, hydroxy, $C_{1-4}$alkoxy or $C_{2-4}$hydroxyalkoxy; $C_{1-4}$alkoxy or $C_{1-4}$alkoxy substituted by fluoro, chloro, bromo, iodo, —COOM, cyano, hydroxy, $C_{1-4}$alkoxy or $C_{2-4}$hydroxyalkoxy, with the proviso that any $C_{1-4}$alkoxy substituted by hydroxy, $C_{1-4}$alkoxy or $C_{2-4}$hydroxyalkoxy has 2 to 4 carbon atoms.

3. A dye according to claim 2
wherein each of
$R_1$, $R_2$ and $R_4$ is independently hydrogen, methyl, methoxy, hydroxy or chloro, and
$R_3$ is hydrogen, methyl, methoxy, hydroxy, chloro or —O—$CH_2$—COOM.

4. A dye according to claim 3 wherein at least one of $R_1$ and $R_2$ is hydrogen.

5. A dye according to claim 4
wherein
K is the product of the condensation, under acidic conditions, or formaldehyde with
(i) a compound of the formula

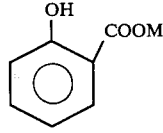 or (ii) a mixture of a compound of the formula

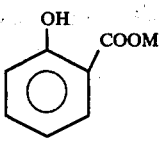

with resorcinol or a cresol, wherein at least 80 mol % of the mixture is a compound of the formula

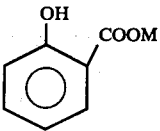

wherein M is hydrogen or a non-chromophoric cation, with the proviso that the mol ratio of formaldehyde of the compound or mixture of compounds of (i) or (ii) is 0.6–0.95:1.

6. A dye according to claim 5 wherein
K is the product of the condensation, under acidic conditions, of formaldehyde with a compound of the formula

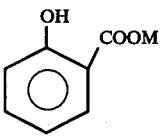

wherein M is hydrogen or a non-chromophoric cation, with the proviso that the mol ratio of formaldehyde to the compound of the formula

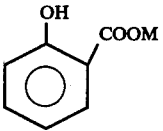

is 0.6–0.95:1.

7. A dye according to claim 1 wherein
D is a diazo component radical having at least one metallized azo group and at least one —SO$_3$M group, with the proviso that the number of —SO$_3$M groups that it contains is equal to or greater than the number of azo groups and equal to or less than the number of aromatic carbocyclic rings that it contains, and
—D— is a bisdiazo component radical having at least one metallized azo group and at least one —SO$_3$M group, with the proviso that the number of —SO$_3$M groups that it contains is equal to or greater than the number of azo groups and equal to or less than the number of aromatic carbocyclic rings that it contains.

8. A dye according to claim 1 having a diazo component radical D'-,
wherein
D'— is
A—N=N—(B—N=N)$_p$(C—N=N)$_q$E—N=N—,
wherein A is the radical of a diazo component or a coupling component,
each of
B and C is independently the radical of a bisdiazo component, an at least twice couplable coupling component or a coupling/diazo component,
E is the radical of a bisdiazo component or a coupling/diazo component,
with the provisos that B is the radical of the bisdiazo component or a coupling/diazo component when A is the radical of a coupling component and is the radical of an at least twice couplable coupling component or a coupling/diazo component when A is the radical of a diazo component and C is the radical of a bisdiazo component or a coupling/diazo component when E is the radical of a coupling/diazo component and is the radical of an at least twice couplable coupling component or a coupling-/diazo component when E is the radical of a bisdiazo component, and
each of
p and q is independently 0 or 1, with the proviso that D' contains 2 to 5 azo groups at least one of which is metallized.

9. A dye according to claim 8 wherein each of
R$_1$, R$_2$ and R$_4$ is independently hydrogen, methyl, methoxy, hydroxy or chloro, with the proviso that at least one of R$_1$ and R$_2$ is hydrogen, and
R$_3$ is hydrogen, methyl, methoxy, hydroxy, chloro or —O—CH$_2$—COOM.

10. A dye according to claim 9 wherein
K is the product of the condensation, under acid conditions, of formaldehyde and
(i) a compound of the formula

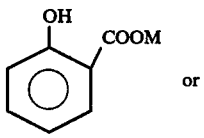 or (ii) a mixture of a compound of the formula

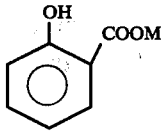

with resorcinol or a cresol, wherein at least 80 mol % of the mixture is a compound of the formula

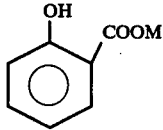

wherein
M is hydrogen or a non-chromophoric cation, with the proviso that the mol ratio of formaldehyde to the compound or mixture of compounds of (i) or (ii) is 0.6–0.95:1.

11. A dye according to claim 9 wherein A is the radical of a diazo component.

12. A dye according to claim 11 wherein
A is

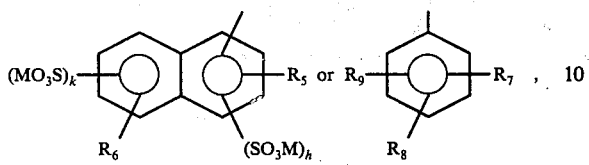

wherein
R$_5$ is hydrogen, hydroxy or —SO$_3$M,
R$_6$ is hydrogen or nitro,
R$_7$ is hydrogen, hydroxy, C$_{1-4}$alkyl, C$_{1-4}$alkoxy, —COOM or chloro,
R$_8$ is hydrogen, C$_{1-4}$alkyl, C$_{1-4}$alkoxy, —COOM, chloro, —SO$_3$M, nitro, formamido, (C$_{1-4}$alkyl)carbonylamino, benzamido, phenylsulfonylamino, tolylsulfonylamino or

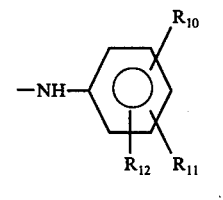

wherein each of
R$_{10}$ and R$_{11}$ is independently hydrogen, nitro or —SO$_3$M, and
R$_{12}$ is hydrogen, C$_{1-4}$alkyl, C$_{1-4}$alkoxy, chloro or —COOM,
R$_9$ is hydrogen, C$_{1-4}$alkyl, chloro, —SO$_3$M, sulfamoyl or nitro,
h is 0 or 1, and
k is 0 or 1,
wherein each
M is independently hydrogen or a non-chromophonic cation.

13. A dye according to claim 12 wherein
R$_8$ is hydrogen, C$_{1-4}$alkyl, C$_{1-4}$alkoxy, —COOM, chloro, —SO$_3$M, nitro, formamido, acetamido, phenylsulfonylamino, tolylsulfonylamino or

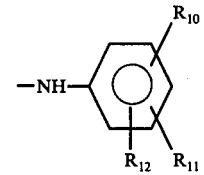

wherein each of
R$_{10}$ and R$_{11}$ is independently hydrogen, nitro or —SO$_3$M, and
R$_{12}$ is hydrogen, C$_{1-4}$alkyl, C$_{1-4}$alkoxy, chloro or —COOM, and
the sum of h and k is 0 or 1 when R$_5$ is —SO$_3$M and is 1 or 2 when R$_5$ is hydrogen or hydroxy.

14. A dye according to claim 13 wherein
R$_8$ is hydrogen, C$_{1-4}$alkyl, C$_{1-4}$alkoxy, —COOM, chloro, —SO$_3$M, nitro, formamido, acetamido or 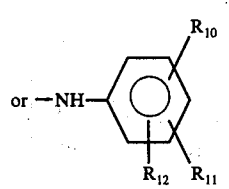, wherein each
of R$_{10}$ and R$_{11}$ is independently hydrogen, nitro or —SO$_3$M, and
R$_{12}$ is hydrogen, C$_{1-4}$alkyl, C$_{1-4}$alkoxy, chloro or —COOM.

15. A dye according to claim 12 wherein each of B, C and E is independently the
radical of a coupling/diazo component.

16. A dye according to claim 15
wherein each of
B, C and E is independently

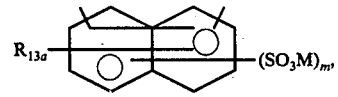

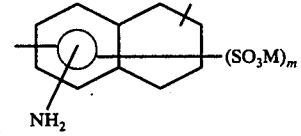

or 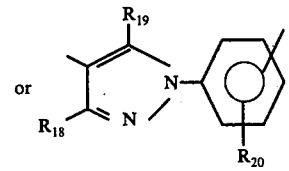

or the radical of a coupling/diazo component of the formula

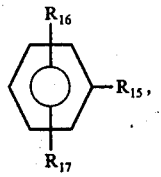

wherein
R$_{13a}$ is hydrogen, hydroxy or

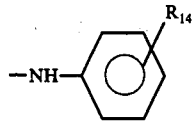, wherein
R$_{14}$ is hydrogen, C$_{1-4}$alkyl, C$_{1-4}$alkoxy or chloro,
R$_{15}$ is —NH$_2$, acylamino, —NH—CH$_2$—SO$_3$M or

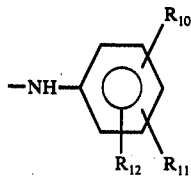

wherein each of
R₁₀ and R₁₁ is independently hydrogen, nitro or —SO₃M, and
R₁₂ is hydrogen, C₁₋₄alkyl, C₁₋₄alkoxy, chloro or —COOM,
R₁₆ is hydrogen, C₁₋₄alkyl, C₁₋₄alkoxy, hydroxy, chloro, —NH₂ or —COOM,
R₁₇ is hydrogen, C₁₋₄alkyl, C₁₋₄alkoxy, or —SO₃M,
R₁₈ is C₁₋₄alkyl, —COOM, —COOR₂₁ or —COR₂₁, wherein R₂₁ is C₁₋₄alkyl or phenyl,
R₁₉ is hydroxy or —NH₂,
R₂₀ is hydrogen, C₁₋₄alkyl, C₁₋₄alkoxy, chloro or —SO₃M, and
m is 1 or 2,
with the proviso that in any radical of the formula

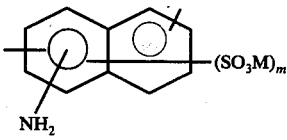

the —NH₂ group is ortho to an azo group.

17. A dye according to claim 16 wherein
R₁₅ is —NH₂, acetamido, —NH—CH₂—SO₃M or

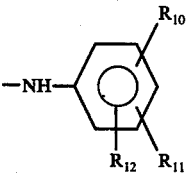

18. A dye according to claim 17 wherein each of
B, C and E is independently

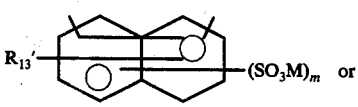

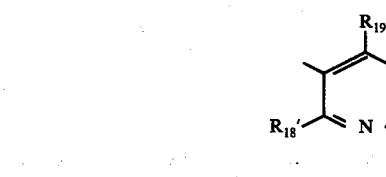

or the radical of a coupling/diazo component of the formula

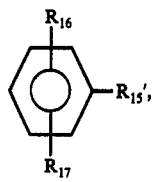

wherein
R₁₃' is hydrogen, hydroxy, phenylamino or tolylamino,
R₁₅' is —NH₂, acetamido, —NH—CH₂—SO₃M or

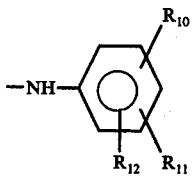

wherein each of
R₁₀ and R₁₁ is independently hydrogen, nitro or —SO₃M, and
R₁₂ is hydrogen, C₁₋₄alkyl, C₁₋₄alkoxy, chloro or —COOM,
R₁₆ is hydrogen, C₁₋₄alkyl, C₁₋₄alkoxy, hydroxy, chloro, —NH₂ or —COOM,
R₁₇ is hydrogen, C₁₋₄alkyl, C₁₋₄alkoxy, or —SO₃M,
R₁₈' is methyl,
R₁₉' is hydroxy,
R₂₀' is hydrogen or —SO₃M, and m is 1 or 2.

19. A dye according to claim 16 wherein each of
B, C and E is independently

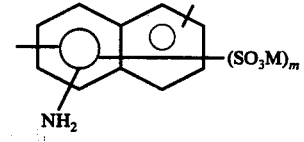

or the radical of a coupling/diazo component of the formula

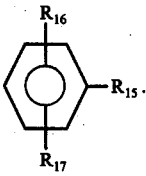

20. A dye according to claim 16 wherein one of
B, C and E is

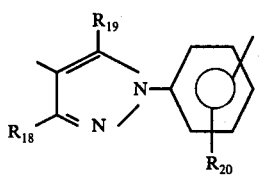

and each of the others is independently

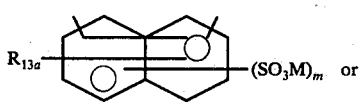

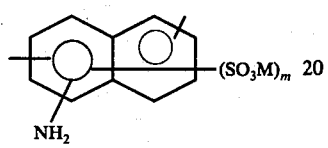

or the radical of a coupling/diazo component of the formula

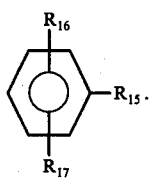

21. A dye according to claim 16
wherein each of
$R_1$, $R_2$, $R_3$ and $R_4$ is independently hydrogen; fluoro; chloro; bromo; iodo; hydroxy; $C_{1-4}$alkyl; $C_{1-4}$alkyl substituted by fluoro, chloro, bromo, iodo, —COOM, cyano, hydroxy, $C_{1-4}$alkoxy or $C_{2-4}$hydroxyalkoxy; $C_{1-4}$alkoxy or $C_{1-4}$alkoxy substituted by fluoro, chloro, bromo, iodo, —COOM, cyano, hydroxy, $C_{1-4}$alkoxy or $C_{2-4}$hydroxyalkoxy, with the proviso that any $C_{1-4}$alkoxy substituted by hydroxy, $C_{1-4}$alkoxy or $C_{2-4}$hydroxyalkoxy has 2 to 4 carbon atoms.

22. A dye according to claim 21
wherein each of
$R_1$, $R_2$ and $R_4$ is independently hydrogen, methyl, methoxy, hydroxy or chloro, with the proviso that at least one of $R_1$ and $R_2$ is hydrogen, and
$R_3$ is hydrogen, methyl, methoxy, hydroxy, chloro or —O—$CH_2$—COOM.

23. A dye according to claim 22
wherein
K is the product of the condensation, under acid conditions, of formaldehyde and
(i) a compound of the formula

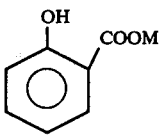

or (ii) a mixture of a compound of the formula

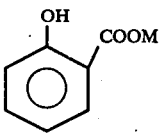

with resorcinol or a cresol, wherein at least 80 mol % of the mixture is a compound of the formula

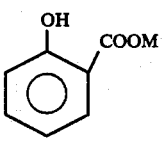

wherein
M is hydrogen or a non-chromophoric cation, with the proviso that the mol ratio of formaldehye to the compound or mixture of compounds of (i) or (ii) is 0.6–0.95:1.

24. A dye according to claim 23 wherein at least one of p and q is 0.

25. A dye according to claim 24
wherein
p is 0, and
q is 0.

26. A dye according to claim 23
wherein each of
B, C and E is independently

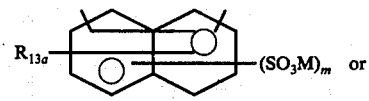

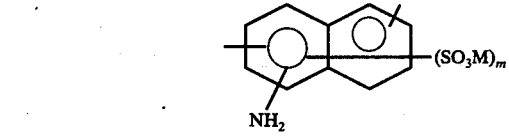

or the radical of a coupling/diazo component of the formula

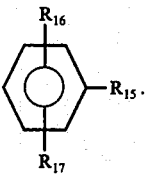

* * * * *

UNITED STATES PATENT AND TRADEMARK OFFICE
CERTIFICATE OF CORRECTION

PATENT NO. : 4,123,428
DATED : October 31, 1978
INVENTOR(S) : Herbert Holliger et al.

It is certified that error appears in the above-identified patent and that said Letters Patent are hereby corrected as shown below:

Column 17, line 21, "of" (first occurrence) should read -- to --. Column 18, lines 9-25 should read -- with the provisos that (1) when p is 0 and q is 0, E is the radical of a bisdiazo component when A is the radical of a coupling component and is the radical of a coupling/diazo component when A is the radical of a diazo component, (2) when p is 1 and q is 0, (a) B is the radical of a bisdiazo component when A is the radical of a coupling component and E is the radical of a coupling/diazo component, (b) B is the radical of an at least twice couplable coupling component when A is the radical of a diazo component and E is the radical of a bisdiazo component, and (c) B is the radical of a coupling/diazo component when A is the radical of a diazo component and E is the radical of a coupling/diazo component or when A is the radical of a coupling component and E is the radical of a bisdiazo component, and (3) when p is 1 and q is 1, (a) A is the radical of a diazo component, B is the radical of a coupling/diazo component, C is the radical of a coupling/diazo component and E is the radical of a coupling/diazo component, (b) A is the radical of a diazo component, B is the radical of a coupling/diazo component, C is the radical of an at least twice couplable coupling component and E is the radical of a bisdiazo component, (c) A is the radical of a diazo component, B is the radical of an at least twice couplable coupling component, C is the radical of a bisdiazo component and E is the radical of a coupling/diazo component, (d) A is the radical of a diazo component, B is the radical of an at least twice couplable coupling component, C is the radical of a coupling/diazo component and E is the radical of a bisdiazo component, (e) A is the radical of a coupling component, B is the radical of a bisdiazo component, C is the radical of a coupling/diazo component and E is the radical of a coupling/diazo component, (f) A is the radical of a coupling component, B is the radical of a bisdiazo component, C is the radical of

UNITED STATES PATENT AND TRADEMARK OFFICE
CERTIFICATE OF CORRECTION

PATENT NO. : 4,123,428

DATED : October 31, 1978

INVENTOR(S) : Herbert Holliger et al.

It is certified that error appears in the above-identified patent and that said Letters Patent are hereby corrected as shown below:

an at least twice couplable coupling component and E is the radical of a bisdiazo component, (g) A is the radical of a coupling component, B is the radical of a coupling/diazo component, C is the radical of a bisdiazo component and E is the radical of a coupling/diazo component or (h) A is the radical of a coupling component, B is the radical of a coupling/diazo component, C is the radical of a coupling/diazo component and E is the radical of a bisdiazo component, each of p and q is independently 0 or 1, with the provisos that D'- contains 2 to 5 azo groups at least one of which is metallized and when p is 0, q must be 0. --.

Column 20, line 33, the structural formula should read

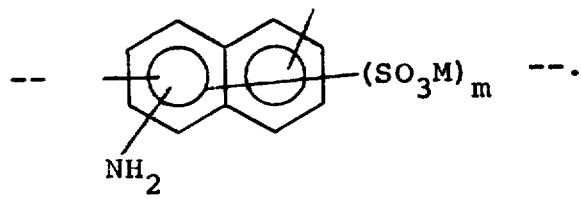

Signed and Sealed this

Nineteenth Day of June 1979

[SEAL]

Attest:

RUTH C. MASON
Attesting Officer

DONALD W. BANNER
Commissioner of Patents and Trademarks